R. A. HOPF & C. MAAS.
JOINT FOR DOLL HEADS AND THE LIKE.
APPLICATION FILED FEB. 4, 1918.
1,273,061.
Patented July 16, 1918.
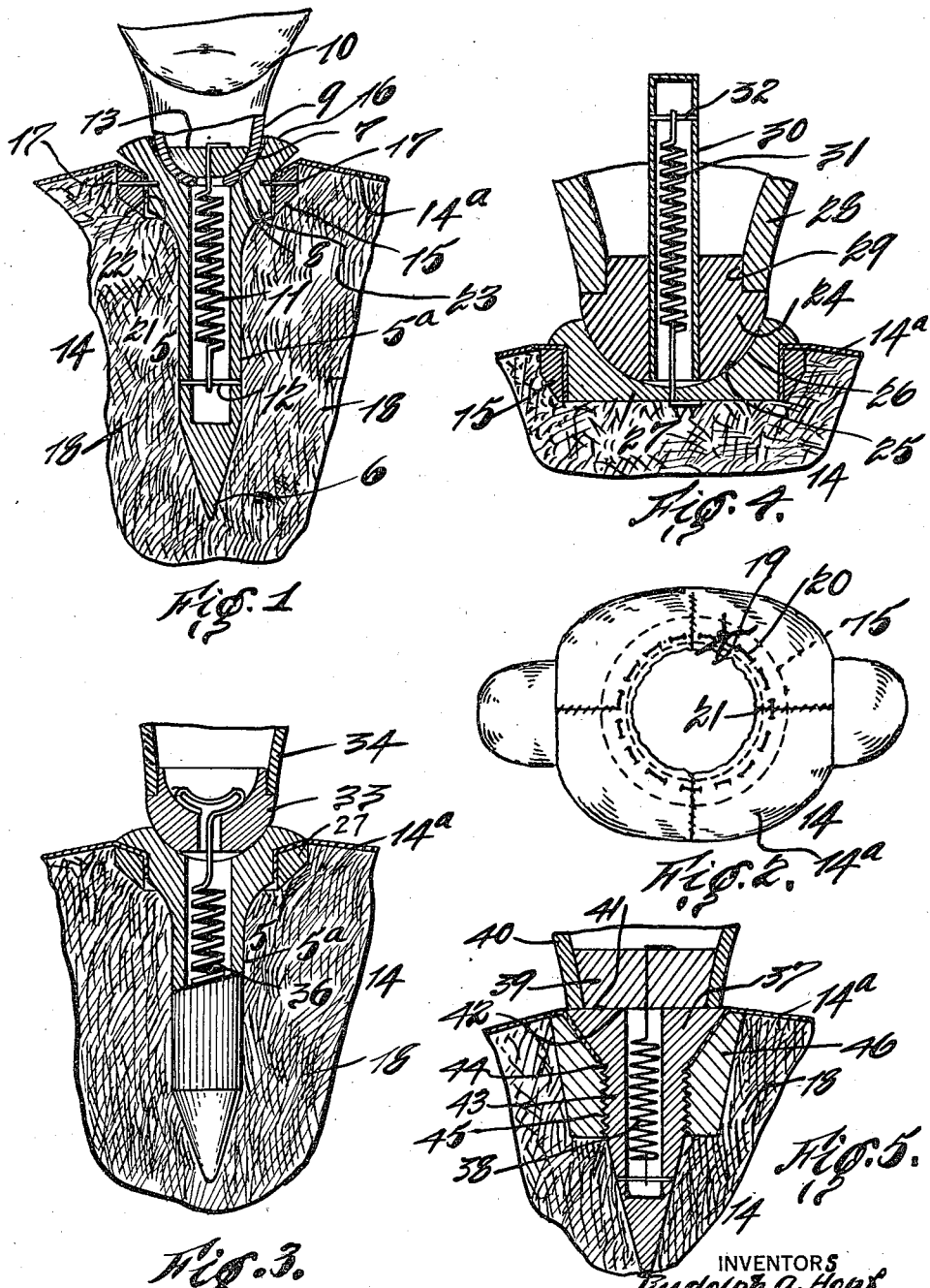
INVENTORS
Rudolph A. Hopf
Carl Maas
BY
Maurice Bloch
ATTORNEY

UNITED STATES PATENT OFFICE.

RUDOLPH A. HOPF AND CARL MAAS, OF NEW YORK, N. Y.

JOINT FOR DOLL-HEADS AND THE LIKE.

1,273,061.  Specification of Letters Patent.  Patented July 16, 1918.

Application filed February 4, 1918. Serial No. 215,255.

*To all whom it may concern:*

Be it known that we, RUDOLPH A. HOPF and CARL MAAS, both citizens of the United States of America, residing at New York city, county and State of New York, have invented certain new and useful Improvements in Joints for Doll-Heads and the like, of which the following is a full, clear, and exact description.

This invention relates to improvements in dolls and the like, one of the main objects being to provide a simple, durable and effective means to adjustably secure the movable members, such as the legs, head and arms to the body. Our improved connection is particularly well adapted for application to stuffed dolls or animal-bodies, but is not, however, limited to such use.

A further object is to provide a connection for the members above mentioned that can be readily attached to and removed from the body without the necessity of ripping the covering for the stuffing or otherwise injuring same.

Other advantageous features of improvement will hereinafter appear. We will now proceed to describe our invention in detail, the novel features of which we will point out in the appended claims, reference being had to the accompanying drawing, forming part hereof, wherein:—

Figure 1 is a sectional view of a portion of a doll-body having our improved connection applied thereto and supporting a doll-head, a portion only of which is shown;

Fig. 2 is a plan view of a doll-body illustrating one of the connection members; and Figs. 3 and 4 and 5 are modified forms of our invention.

While we have illustrated our improved connection as adjustably supporting a doll-head, it should be understood that it is equally as effective to connect arms or legs to a body. As has been stated, our invention is especially applicable to stuffed bodies, as such bodies offer great difficulties for the proper connection or joining of heads, legs and arms thereto, especially when such members are to be adjustably connected. Our improved connection consists of an elongated socket-member 5 pointed at its lower end 6 (Fig. 1), said socket-member being provided at its upper end with a recess 7 to form a seat for a ball or rounded member 8, which may be the lower rounded end of the neck 9 or a leg or arm. In any event, the invention comprises essentially a socket portion having a seat to receive a rounded member, said socket and rounded members being connected to permit them to be moved one upon the other. To retain the members together or to maintain a movable connection between same, we preferably employ a spring 11, one end of which engages a pin 12 in the socketed-member 5, the other end of said spring being connected to the coöperating connection-member. As illustrated in Fig. 1, the upper end of the spring engages a block 13 carried by the head 10 of the doll.

To secure the connection-member to the body 14, we preferably employ a bearing-ring 15 through which the socketed member 5 passes, a flange 16 limiting the inward movement of the said members when they are applied to the body 14. After the socket-member 5 has been inserted through the ring into the body, pins 17 may be passed through the bearing-ring 15 to engage the socketed member 5. It will be apparent that the shank 5ª of the socketed member will be forced into the stuffing 18. The body 14 consists of a casing 14ª filled with any suitable stuffing 18.

The bearing ring 15 is unsecured to either the casing 14ª or stuffing, it being held in by the said stuffing which is forced against same. The opening 19, at the top of the body, or rather the material of the casing surrounding said opening, is drawn, after the ring 15 has been inserted, to decrease the size thereof by a drawing string 20 (see Fig. 2). When in position, the bearing-ring 15 will be covered by the casing 14ª, the edge 21 of the material around the opening 19 being stuffed into the opening 22 of the ring 15, as shown in Fig. 1. When the socket-member 5 is placed in position, the edge 21 of the casing 14ª will be positioned between the ring 15 and shoulder 23 of said socket-member 5. It will be apparent that the socketed member and part adjustably secured thereto (in this instance a doll-head) can be readily removed from the body by withdrawing the pins 17, it being unnecessary to disassemble the supported member and the socketed member. This is a decided advantage over the method now commonly used, which requires the partial disassemblage of the body to obtain access to an interior element which connects the body and movable member, whether it be a spring or other element which is usually anchored in the stuffing in a position somewhat remote from the exterior of the body. Should the spring 11 break, it is a simple and inexpensive operation to remove the parts for the purpose of replacing a new spring.

As far as we are aware, we are the first to produce a socketed connection for the head, arms or legs of a stuffed doll or animal body, such connections heretofore having been merely flexible connections formed by the fabric casing itself. Furthermore, we believe ourselves to be the first to provide a joint or connection permitting of the adjustment of the head, legs and arms for dolls, having stuffed bodies, that can be easily removed without marring the body and without disassembling the members which go to make up the connection. The spring 11 not only permits the head to be moved in any direction around the axis of the member 5, but also maintains the parts connected, whether said parts are attached to a body or removed from a body.

Instead of rounding the lower end of the neck of the doll, we may employ a block 24 (Fig. 4) having a rounded portion 25 to fit the recess or seat 26 of a block 27 which in turn is carried by the bearing ring 15. In this form the head 28 will be cemented or otherwise secured to a shoulder 29 on said block 24. In this form we prefer to provide the block 24 with a tubular post 30 to retain the spring 31, one end of the spring being engaged by a pin 32 in the post 30, the opposite end being connected to the socketed block 27. It will be understood that in this form the post 30 will extend into the head 28.

In the form illustrated in Fig. 3, we employ the socket member 5, as in the form illustrated in Fig. 1, but provide a block 33 to which the head 34 will be suitably secured. In this form the block 33 will be rounded at its lower end to fit the recess in the top of member 5, similarly to the form shown in Fig. 1. A spring 36 will be employed to retain the members adjustably connected, as in the other forms. The shank 5 and block 27 constitute supports for the movable members connected thereto.

In the embodiment of our invention shown in Fig. 5, we employ a socketed member 37 carrying a spring 38, the upper end of which engages a block 39 carried by the head 40 of the doll. In this form the lower end 41 of the neck of the doll is flat and rests against the flat exposed end 42 of the socketed member 37. To retain the socketed member in position, we provide the shank 43 thereof with threads 44 to engage the threads 45 carried by the bearing ring 46. This threaded connection of ring and shank of the socketed member may also be utilized in the form of our improvement illustrated in Figs. 1, 3 and 4.

What we claim as our invention is:

1. The combination of a stuffed body, a socketed shank extending into said body, a member rotatably connected to said shank at its exposed end, and a spring to yieldably maintain said rotatably connected member in contact with said shank.

2. The combination of a stuffed body, a support, having a seat, removably secured thereto, and a member adjustably connected to said support.

3. The combination of a stuffed body, a bearing member carried thereby, a support removably secured to said bearing member, a member adjustably connected to the support, and a spring to maintain the support and adjustable member in contact one with the other.

4. The combination of a support having a socketed shank, said support being provided with a recess to form a seat, a block to fit said recess and adapted for the securement thereto of the movable part of a doll, and a spring located in the socket of said shank connecting said support and the said block.

5. The combination of a stuffed doll body, a support secured thereto having a socketed shank extending into the stuffing of the body, a head adjustably connected to the exposed end of the support, and a spring connecting the head and support.

6. The combination of a support, a doll part adjustably secured thereto, yieldable means connecting the support and doll part, said support being arranged for connection to or disconnection from a doll body without disassembling the support and part connected thereto.

7. The combination of a stuffed doll body, a socketed member carried thereby, and a doll part adjustably connected to the socketed member, said part being disconnected from the stuffed body.

8. The combination of a stuffed doll body, a support carried thereby and having a recess to form a seat, a head having a neck portion rounded to engage the seat in said support, and a spring connecting the support and said head.

9. The combination of a body consisting of a fabric casing, stuffing therefor, a bearing member at the neck portion of the body, located between the stuffing and the fabric casing and provided with a central opening therethrough, a support passing through said opening into the stuffing, means to releasably secure the support and bearing member, and a head portion adjustably secured to said support.

10. The combination of a body consisting of a fabric casing, stuffing therefor, a bearing member at the neck portion of the body, located between the stuffing and the fabric casing and provided with a central opening therethrough, a support passing through said opening into the stuffing, means to releasably secure the support and bearing member, a head portion adjustably secured to said support and a spring carried by the support, engaging the head portion, to maintain said head portion in position upon the support.

11. The combination of a support, a shank projecting therefrom having a socket therein, said support being provided with a recess to form a seat, a doll-head adjustably engaging said seat, and a spring located within the socket connecting the shank and the head, whereby said head is maintained in position in said seat.

12. The combination of a socketed support, a doll-head, and a spring in said socket, one end of the spring being connected to the doll-head, and the other end to the said support.

Signed at New York city, N. Y., this 31 day of January, 1918.

RUDOLPH A. HOPF.
CARL MAAS.

Witnesses:
EDWARD A. JARVIS,
MAURICE BLOCH.